(12) United States Patent
Usami

(10) Patent No.: US 6,205,516 B1
(45) Date of Patent: Mar. 20, 2001

(54) DEVICE AND METHOD FOR CONTROLLING DATA STORAGE DEVICE IN DATA PROCESSING SYSTEM

(75) Inventor: Hajime Usami, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/184,173

(22) Filed: Nov. 2, 1998

(30) Foreign Application Priority Data

Oct. 31, 1997 (JP) .................................................. 9-301306

(51) Int. Cl.[7] ...................................................... G06F 12/00
(52) U.S. Cl. ...................... 711/105; 365/230.06; 365/233
(58) Field of Search ........................ 711/105; 365/230.06, 365/233

(56) References Cited

U.S. PATENT DOCUMENTS

| | | | |
|---|---|---|---|
| 5,787,457 | * 7/1998 | Miller et al. | 711/105 |
| 5,812,491 | * 9/1998 | Shinozaki et al. | 365/233 |
| 5,940,875 | * 8/1999 | Inagaki et al. | 711/217 |

* cited by examiner

Primary Examiner—Do Yoo
Assistant Examiner—Mehdi Namazi

(57) ABSTRACT

A mode register setting region for SDRAM is provided on a memory map. In order to set the mode register with a desired operation mode, a CPU executes a writing operation to write a command content to this mode register setting region. In other words, the CPU outputs address data for that region and I/O data indicative of the desired command content. A control signal generating circuit receives this address data, and judges whether or not this address data is for the mode register setting region. When the control signal generating circuit determines that this address data is for the mode register setting region, the control signal generating circuit outputs a selection signal to the selection circuit. Upon receipt of the selection signal, the selection circuit generates specific address data, to be set to the mode register, based on the I/O data that has been inputted together with the original address data and that has been written in a region indicated by the address data. The selection circuit outputs the specific address data to the internal RAM. The mode register in the RAM is thus set with the content of the desired mode indicated by the specific address data.

22 Claims, 9 Drawing Sheets

FIG. 3

| KINDS OF COMMAND | CS | RAS | CAS | WE |
|---|---|---|---|---|
| READ | L | H | L | H |
| WRITE | L | H | L | L |
| MODE REGISTER SET | L | L | L | L |

DEVICE AND METHOD FOR CONTROLLING DATA STORAGE DEVICE IN DATA PROCESSING SYSTEM

BACKGROUND OF THE INVENTION

1. Field of the Invention

The present invention relates to a device for controlling a data storage device, such as DRAM (dynamic random access memory) and the like, and to a method for controlling the data storage device which is connected to a CPU and the like in a data processing system.

2. Description of Related Art

DRAM is generally used as a main memory for a microprocessor or the like computer. Efforts have been made to increase the capacity of this DRAM in order to improve the performance of the entire computer systems.

In recent years, there has been increasing demand not only to increase the memory capacity, but also to increase the data transfer rate of the DRAM in accordance with increase in the speed of microprocessors. This has led to the development of various types of high speed DRAM.

Representative examples of the high-speed DRAM includes: DRAM provided with high-speed access mode called "fast page mode". DRAM provided with extended data out (EDO) page mode; DRAM provided with burst extended data out (EDO) page mode; synchronous DRAM (SDRAM); and Rambus DRAM. The SDRAM and Rambus DRAM are synchronous DRAMs, while the fast page mode DRAM, the EDO-DRAM, and the burst EDO-DRAM are asynchronous DRAMs.

Recently, SDRAM is generally used as a main memory in a high performance machine such as a server computer. The SDRAM is now being used also in other several machines of personal use such as personal computers and personal printers.

The SDRAM is a high-speed DRAM that can operate in synchronization with a clock signal supplied to a computer such as a microprocessor. There has been realized such a high-speed SDRAM that can attain a high data transfer rate of 800 megabytes per second using a 64 bit wide data bus and a clock signal at frequency of 100 MHz.

In order to attain this high-speed operation, SDRAM is provided with an internal column address counter. The column address counter is mounted on a SDRAM chip. This internal address counter is used during a transfer mode called "burst mode". When column address data is inputted, the column address counter counts up, from the inputted column address, a successive series of column addresses in synchronization with a clock signal, whereby data reading/writing operation can be executed on the successive series of addresses.

It is noted that a user can freely set burst length and CAS latency of the burst mode. The burst length is defined as the number of data to be serially inputted/outputted in synchronization with the clock signal. The CAS latency is defined as the number of clock cycles set after a column address strobe signal CAS is inputted until data is actually started being outputted. Thus, the system can be designed according to the user's desire.

SUMMARY OF THE INVENTION

In order to set the burst length and the CAS latency to the SDRAM, specific parameters have to be stored into an internal register called "mode register," which is provided also on the SDRAM chip. Because SDRAM thus requires the special mode register setting operation, it is difficult to use SDRAM in general type systems.

In order to set the specific parameters into the mode register, a predetermined control signal is first inputted to the SDRAM so that an operation mode of SDRAM is set into a mode register setting mode. Then, specific parameter are stored into the mode register in the form of address data that is constructed from a combination of predetermined several bits. If address data for SDRAM is defined by twelve bits A0 through A11, for example, CAS latency is set by three bits A4–A6, and the burst length is set by other three bits A0–A2. In order to perform the parameter setting operation, remaining high-order bits A7–A11 have to be fixed to zero (0).

According to the contents of the parameters (burst length and/or CAS latency) to be set, however, the address data A0–A11 may possibly indicate some address that could not be defined in the system. It becomes difficult to design a memory map and hardware construction of the entire system.

The present invention is attained to solve the above-described problems. An object of the present invention is therefore to provide a device and method for controlling a data storage device provided in a data processing system, in which a memory map can be easily designed and therefore the hardware can be easily constructed even when the data storage device is of a type, such as SDRAM, that sets a mode register with information in the form of address data.

In order to attain the above and other objects, the present invention provides a control device for controlling a data storage device of a type that receives address data indicative of a desired operation mode and that sets the desired operation mode in an operation mode setting portion provided thereto, the control device comprising: means for receiving; a control signal for setting an operation mode, address data indicative of an operation mode setting portion of the data storage device, and command data indicative of a content of an operation mode desired to be set to the data storage device; means for judging whether or not the received address data indicates the operation made setting portion: means for, when the address data indicates the operation mode setting portion, producing specific address data indicating the desired operation mode based on the received command data and a specific control signal for setting the operation mode setting portion; and means for outputting, to the data storage device, the specific address data and the specific control signal, thereby causing the operation mode setting portion to be set with the desired operation mode.

According to another aspect, the present invention provides a control system, comprising: a data storage device including: a plurality of memory elements; means for storing designation information designating an operation mode of the data storage device; and means for controlling an operation of the data storage device in accordance with the designation information stored in the information storing means, the controlling means selecting a desired memory element indicated by memory element address data when the memory element address data and a memory element control signal are inputted, the controlling means extracting designation information from designation address data and storing the designation information to the information storage means when the designation address data and a designation control signal are inputted; a data processing device for writing process data to and reading process data from the selected memory element, the data processing device outputting original address data, an original memory control signal, an original designation control signal, and designation content data indicative of a desired operation mode; and a control device for controlling the data storage device, the control device being connected between the data storage device and the data processing device, the control device including: means for judging whether or not the original address data inputted from the data processing device indicates the information storage means; means for, when the original address data indicates the information storage means, producing the designation address data, including the designation information, based on the designation content data, which is outputted from the data processing device in correspondence with the original address data, and for producing the designation control signal based on the original designation control signal; means for, when the original address data indicates some memory element, producing the memory element address data based on the original address data and for producing the memory element control signal based on the original memory element control signal; and means for outputting, to the data storage device, the designation address data and the designation control signal when the designation address data and the designation control signal are produced, and for outputting, to the data storage device, the memory element address data and the memory element control signal when the memory element address data and the memory element control signal are produced.

According to still another aspect, the present invention provides a control system for controlling a data storage device, the system comprising: a data storage device including: a plurality of memory elements; means for storing designation information designating an operation mode of the data storage device; and means for controlling operation of the data storage device in accordance with: the designation information stored in the information storing means and a control signal and address data inputted thereto, thereby selecting a desired memory element in accordance with input of address data, and, in response to specific address data inputted together with a predetermined control signal, extracting the designation information from the specific address data and storing the designation information to the information storage means; a data processing device for writing process data to and reading process data from the selected memory element of the data storage device, the data processing device outputting original process data and original address data; and a control device for controlling the data storage device, the control device being connected between the data storage device and the data processing device, the control device producing the control signal, the address data, and the process data based on the original address data and the original process data outputted from the data processing device, the control device including: means for judging whether or not the original address data outputted from the data processing device indicates the information storage means to be selected; means for, when the original address data indicates the information storage means, producing the specific address data, including the designation information, based on the original process data outputted from the data processing device in correspondence with the original address data; and means for outputting, to the data storage device, the specific address data including the designation information.

According to a further aspect, the present invention provides a control device for controlling a data storage device, the control device being provided in connection with the data storage device and a data processing device, the data storage device including: a plurality of memory elements; means for storing designation information designating an operation mode of the data storage device; and means for controlling an operation of the data storage device in accordance with: the designation information stored in the information storing means and a control signal and address data inputted thereto, thereby selecting a desired memory element in accordance with an input of address data, and, in response to specific address data inputted together with a predetermined control signal, extracting the designation information from the specific address data and storing the designation information to the information storage means, the data processing device being for writing process data to and reading process data from the selected memory element of the data storage device, the data processing device outputting original process data and original address data, the control device being for producing the control signal, the address data, and the process data based on the original address data and the original process data outputted from the data processing device, the control device including: means for judging whether or not the original address data outputted from the data processing device indicates the information storage means to be selected; means for, when the original address data indicates the information storage means, producing specific address data, including the designation information, based on the original process data outputted from the data processing device in correspondence with the original address data; and means for outputting, to the data storage device, the specific address data including the designation information.

With the above-described structure, the data processing device performs writing operation to write original process data, indicative of the content of the designation information, while selecting an address region for the information storage means of the data storage device. As a result, the data processing device outputs the original process data and original address data indicative of the address region. The judging means judges the original address data outputted from the data processing device. When the original address data is outputted from the data processing device, the judging means determines that the original address data designates the information storage means in the data storage device. When such a judgment is attained, the address data producing means produces specific address data, including the designation information, based on the original process data that has been outputted in correspondence with the original address data and that indicates the contents desired to be stored in the information storage means. The specific address data is then outputted to the data storage device by the address data output means. As a result, the data storage device stores the designation information in the information storage means, thereby performing the desired operation mode.

Even when the data storage device is designed to receive and store designation information into the information storage means using the specific address data, the storage operation can be attained through merely performing writing operation to write the designation information onto a predetermined address region allocated on a memory map of the general type. Accordingly, the memory map can be made easily, and therefore the hardware of the system can be easily designed.

According to another aspect, the present invention provides a method for controlling a data storage device of a type that receives address data indicative of a desired operation mode and that sets the desired operation mode in an operation mode setting portion provided thereto, the method comprising the steps of: receiving; a control signal for setting an operation mode, address data indicative of an operation mode setting portion of the data storage device, and command data indicative of a content of an operation mode desired to be set to the data storage device; judging whether or not the received address data indicates the operation mode setting portion; producing, when the address data indicates the operation mode setting portion, specific address data indicating the desired operation mode, based on the received command data, and a specific control signal for setting the operation made setting portion; and outputting, to the data storage device, the specific address data and the specific control signal, thereby causing the operation mode setting portion to be set with the desired operation mode.

According to still another aspect, the present invention provides a method for controlling a data storage device located in a data processing system, which includes at least the data storage device, a data processing device, and another peripheral device, the data storage device including: a plurality of memory elements; means for storing designation information designating an operation mode of the data storage device; and means for controlling an operation of the data storage device in accordance with: the designation information stored in the information storing means, and a control signal and address data inputted thereto, thereby selecting a desired memory element in accordance with an input of address data, and, in response to specific address data inputted together with a predetermined control signal, extracting the designation information from the specific address data and storing the designation information to the information storage means, the data processing device being for writing process data to and reading process data from the selected memory element of the data storage device, the method for controlling the data storage device includes the steps of: allocating an address region for the memory elements of the data storage device and another address region for the peripheral device in a predetermined address space for the entire data processing system; outputting original process data, including encoded designation information, together with original address data indicative of the peripheral device when desiring to store designation information to the information storage means; decoding the original process data, outputted together with the original address data, and extracting the designation information from the original process data; encoding the extracted designation information and producing specific address data and a specific control signal; and outputting the specific address data, which includes the designated identification information, and the specific control signal to the data storage device.

According to the above-described method, first, the address region for the memory element part of the data storage device and the address region for the peripheral device are set in the address space for the entire data processing system. When desiring to store designation information to the information storage means of the memory device, original address data indicative of the peripheral device address region is outputted together with original process data encoded with the designation information.

Then, the original process data, that has been outputted together with the original address data and that includes data of the contents desired to be stored in the information memory means, is decoded to extract the designation information therefrom. The extracted designation information is then encoded into the specific address data. A control signal for controlling storage of the designation information is also produced. The control signal and the specific address data is outputted to the data storage device. As a result, the data storage device stores the designation information in the information storage means so that the data storage device will perform the desired operation mode.

BRIEF DESCRIPTION OF THE DRAWINGS

In the drawings:

FIG. 3 illustrates kinds of commands to be used for the data storage device of FIG. 2, and shows levels of control signals for setting each command;

DETAILED DESCRIPTION OF THE PREFERRED EMBODIMENT

A device and method for controlling a data storage device according to a preferred embodiment of the present invention will be described while referring to the accompanying drawings.

Figure 1:
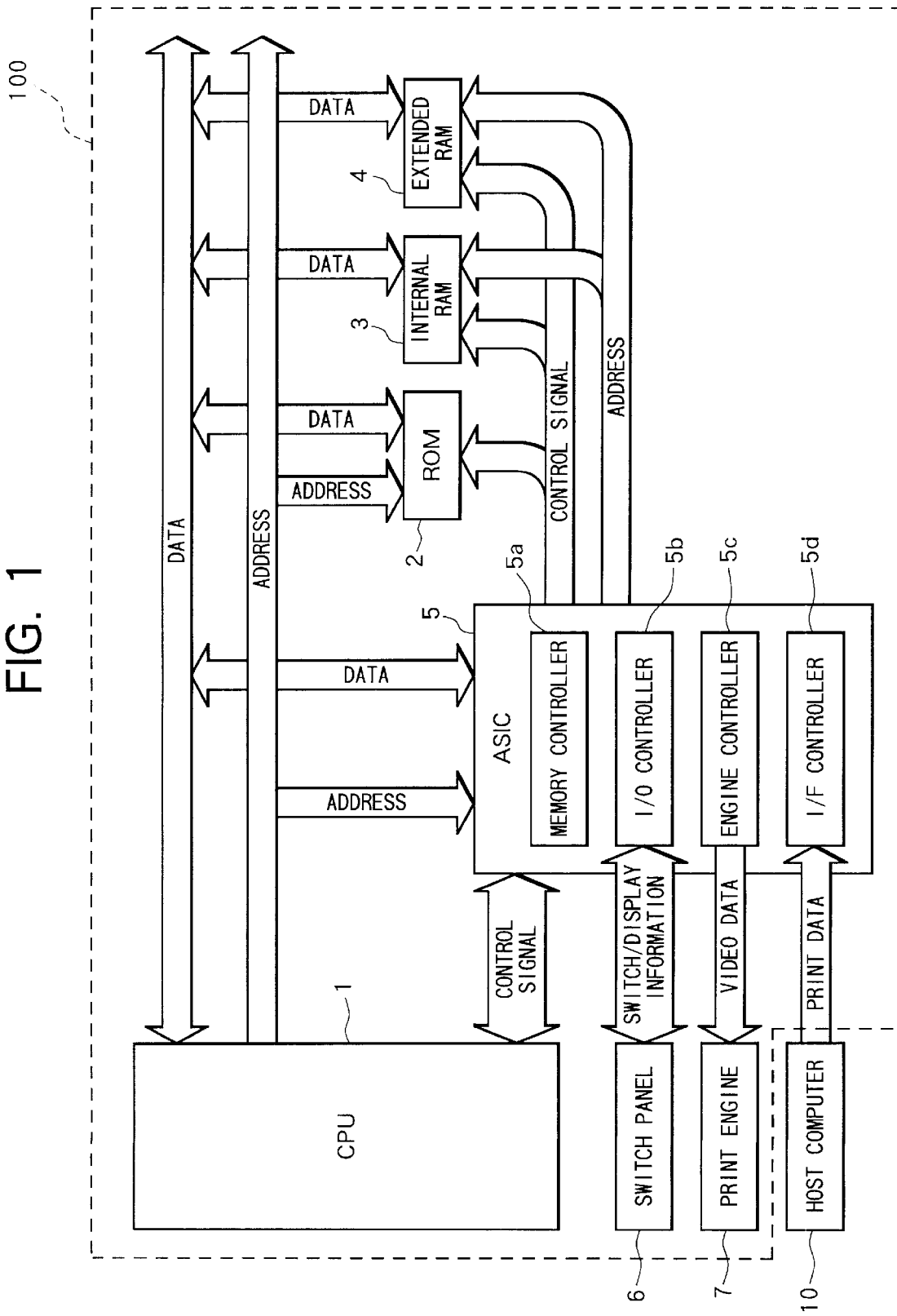
FIG. 1 is a block diagram showing a construction of a data processing system according to an embodiment of the present invention.

FIG. 1 shows the general construction of a print system (data processing system), in which the control device of the present invention is applied.

This print system is constructed from: a printing device 100 and a host computer 10 which is a personal computer or the like. The printing device 100 and the host computer 10 are connected to each other. The printing device 100 is for receiving print data outputted from the host computer 10, and is for temporarily storing the print data in RAM devices 3 and 4 which are provided in the printing device 100. The printing device 100 is also for producing video data based on the print data and for performing a print operation through outputting the video data to a printing engine 7 provided therein.

The structure of the printing device 100 will be described below in greater detail.

As shown in FIG. 1, the printing device 100 includes a CPU 1; a ROM 2; the internal RAM 3; the extended RAM 4; an Application Specific Integrated Circuit (ASIC) 5; a switch panel 6; and the print engine 7. The ASIC 5 is connected to the CPU 1, the ROM 2, the internal RAM 3, the extended RAM 4, the switch panel 6, and the print engine 7 via various bus lines. The CPU 1 is connected directly to the ROM 2 via data bus and address bus. The CPU 1 is connected also directly to the internal RAM 3 and the extended RAM 4 via data bus.

The ROM 2 is a memory device for storing various control programs to be executed by the CPU 1. For example, the ROM 2 stores an initialization control program for initially setting an operation mode (burst length, CAS latency, and burst type) of each of the RAMs 3 and 4. In addition to the programs, the ROM 2 also stores table data and the like. The ROM 2 stores therein a memory map shown in FIG. 8 prepared for the printer 100. The memory map records addresses assigned to each memory mounted in the printer 100.

The CPU 1 is for controlling various components, such as the ASIC 5, based on the control programs stored in the ROM 2. The CPU 1 controls the various components through performing such operations as outputting address data, inputting and outputting data between components assigned by the address, and inputting and outputting control signals for each component. For example, when the print system is turned ON, the CPU 1 executes the initialization control program to perform operations for initially setting desired operation modes to the RAMs 3 and 4.

The internal RAM 3 is a data storage device serving as both a main memory of the data processing system 100 and a work area required by the CPU 1 for performing calculations. In this example, the internal RAM 3 is constructed from eight synchronous DRAMs (SDRAMs).

The extended RAM 4 is a data storage device that can be installed when the need arises in order to increase the capacity of the main memory 3. In this example, the extended RAM 3 is constructed also from eight synchronous DRAMs (SDRAMs).

The ASIC 5 is an IC circuit specific to this data processing system 100, and is provided to reduce the processing load on the CPU 1. The ASIC 5 includes: a memory control circuit 5a for controlling the ROM 2, the internal RAM 3, and the extended RAM 4; an I/O control circuit 5b for controlling the switch panel 6; an engine control circuit 5c for controlling the print engine 7; and an interface control circuit 5d for controlling communications with the host computer 10.

In the data processing system of the present embodiment, each of the control circuits 5a–5d in the ASIC 5 is assigned a specific address. The CPU 1 can access any of these control circuits 5a–5d by accessing the address specified for that control circuit.

The switch panel 6 includes: a display device, switches, and the like which are provided in a panel on the printing device 100. The switch panel 6 enables a user to set operation modes of the printing device 100 through manipulating the switches. The switch panel 6 displays error messages and the like on the display device.

The print engine 7 is an image forming device that forms images using either an electrophotographic method or an ink-jet method. The print engine 7 forms images on a recording paper based on video data outputted from the engine control circuit 5c.

The construction of the internal RAM 3 will be described below. The extended RAM 4 has the same structure with the internal RAM 3.

Figure 2:
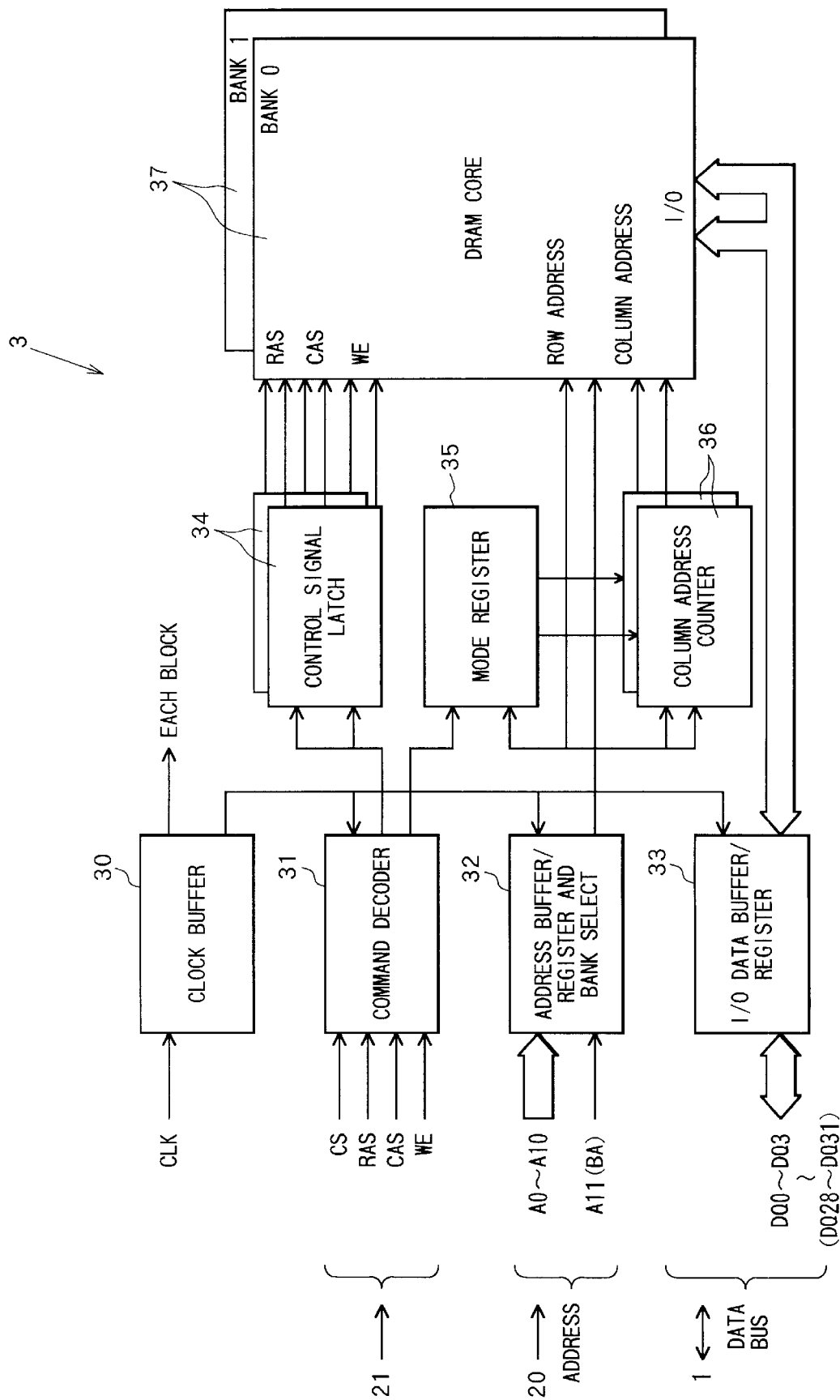
FIG. 2 is a block diagram of the data storage device of FIG. 1.

In the present embodiment, the internal RAM 3 is constructed from eight (8) synchronous DRAMs (SDRAMs), each having a capacity of 4 mega (M) words, where one (1) word is formed of four (4) bits. FIG. 2 shows one of the eight SDRAMs provided in the internal RAM 3.

As shown in FIG. 2, in the present embodiment, each SDRAM includes a DRAM core 37. The DRAM core 37 is constructed from a plurality of banks (two banks 0 and 1, in this case). The SDRAM further includes a clock buffer 30, a command decoder 31, an address buffer/register and bank select 32, a pair of control signal latches 34, a mode register 35, a pair of column address counters 36, and an is I/O data buffer/register 33.

The clock buffer 30 is supplied with a clock signal CLK that is the same as that supplied to the CPU 1 Each block shown in FIG. 2 operates based on the clock signal CLK supplied to the clock buffer 30. Thus, the SDRAM operates in synchronization with the clock signal.

The command decoder 31 is for receiving several types of predetermined control signals: chip select signal CS, row address strobe signal RAS, column address strobe signal CAS, and write enable signal WE. Each control signal is constructed from binary data. Various commands to the SDRAM can be defined based on various combinations of the binary data of the control signals CS, RAS, CAS, and WE. The command decoder 31 serves to decode the received control signals (commands) and to judge a command content based on the combination of the received control signals. The command decoder 31 outputs the judged results (command content) to the mode register 35. The command decoder 31 also serves to output the received row address strobe signal RAS, column address strobe signal CAS, and write enable signal WE to the pair of control signal latches 34.

The pair of control signal latches 34 are provided in correspondence with the pair of banks 0 and 1 of the DRAM core 37. Each control signal latch 34 is for latching the received control signals RAS, CAS, and WE, before outputting them to a RAS terminal, a CAS terminal, and a WE terminal, respectively, of the corresponding bank. The control signals RAS, CAS, and WE will serve as control signals for controlling the corresponding bank.

The address buffer/register and bank select 32 is for receiving address data. Address data is constructed from twelve bits A0–A11. The address buffer/register and bank select 32 has: an address data terminal for receiving address data A0–A10; and a bank select terminal for receiving address data A11.

When desiring to access a memory cell in the DRAM core 37, address data A11 is used for indicating one of the two banks 0 and 1, and address data A0–A10 is used for identifying one memory cell in the indicated bank. More specifically, address data A11 serves as a signal for switching a bank with the other bank. When the address data A11 has a value of zero (0), the bank 0 is selected. When the address data A11 has a value of one (1), the bank 1 is selected. Data of row and column addresses for identifying one memory cell are multiplexed in the address data A0–A10. Address data A0–A10 can therefore indicate any memory cells out of all the memory cells in each bank for 2 M (mega) words ($=2^{11} \times 2^{10}$). Accordingly, with using address data A0–A11 for the two banks, it is possible to select any memory cells out of all the memory cells provided in the SDRAM for 4 M (mega) words The address buffer/register and bank select 32 serves to temporarily store the received address data A0–A11.

An output of the address buffer/register and bank select 32 is connected to: an address data terminal of each DRAM core 37; the mode register 35; and the pair of column address counters 36.

Each bank in the DRAM core 37 is for reading, as a row address, address data A0–A10 that is inputted to the address data terminal from the address buffer/register and bank select 32 when the row address strobe signal RAS, inputted to the terminal RAS, is in Low level. Each bank in the DRAM core 37 is also for reading, as a column address, address data A0–A10 that is inputted to the address data terminal from the address buffer/register and bank select 32 when the column address strobe signal CAS, inputted to the terminal CAS, is in Low level. Accordingly, when selected by bank select A11, any DRAM core bank 37 can designate any memory cell according to the address data A0–A11 where the row and column addresses are multiplexed.

The pair of column address counters 36 are provided in correspondence with the pair of banks of the DRAM core 37. Each column address counter 36 is for latching address data A0–A10, indicative of a column address, that is outputted from the address buffer/register and bank select 32. The column address counter 36 serves to count up the column address by a burst length (column number) in synchronization with the clock signal CLK. The burst length is designated by the mode register 35 as the number of data desired to be serially inputted to and outputted from the SDRAM. The column address counter 36 outputs the counted one or more column addresses to the corresponding DRAM core bank 37. The DRAM core bank 37 successively reads the one or more column addresses. The column address counter 36 performs its column address counting-and-outputting operation at timings so that the DRAM core bank 37 will perform its I/O data processing operation in a burst type and with a CAS latency, the burst type and the CAS latency being designated also by the mode register 35. The burst type is designated as the I/O data outputting timing. The CAS latency is designated as the number of clock cycles required until I/O data is actually started being outputted after column address strobe signal CAS is inputted.

With the above-described arrangement, it is possible to write data into and read data from the SDRAM in synchronization with the clock signal through merely designating one combination of row address and column address.

During the initialization control process, an operation mode of the SDRAM is designated also by the address data A0–A11. The address buffer/register and bank select 32 receives the address data A0–A11 as indicative of the operation mode to be set to the SDRAM. The address buffer/register and bank select 32 serves to output this mode-designating address data A0–A11 to the mode register 35.

The mode register 35 is for extracting operation mode information, such as the CAS latency, the burst type, and the burst length, from the address data A0–A11 when the mode register 35 receives the address data A0–A11 in correspondence with a predetermined "mode register set" command that is received from the command decoder 31. In other words, the mode register 35 extracts the operation mode information from the address data A0–A11 when the address data A0–A11 is inputted to the SDRAM together with the control signals CS, RAS, CAS, and WE indicative of the "mode register set" command. The mode register 35 is also for storing the executed operation mode information therein. According to the operation mode information designated by the address data A0–A11, the mode register 35 supplies each column address counter 36 with a control signal designating the burst length, the burst type, and the CAS latency, thereby controlling count up timing and count up number of the column address counter 36.

The I/O data buffer/register 33 serves as a buffer circuit or register circuit for temporarily storing data to be written to the DRAM core 37 or for temporarily storing data read from the DRAM core 37. The I/O data buffer/register 33 is connected to a corresponding data bus "I/O data DQ0–DQ3" that is connected to the CPU 1. In this example, the internal RAM 3 has eight SDRAMs, each having the same structure as shown in FIG. 2. Therefore, seven other I/O data buffers/registers 33 are further provided in the entire RAM 3 in connection with seven data bus lines I/O data DQ4–DQ7, DQ8–DQ11, DQ12–DQ15, DQ16–DQ19, DQ20–DQ23, DQ24–DQ27, and DQ28–DQ31 that are connected to the CPU 1.

The SDRAM having the above-described structure is set with basic commands and an operation mode in a manner described below.

A desired command can be designated for the SDRAM through controlling the levels of the control signals: chip select CS, row address strobe RAS, column address strobe CAS, and write enable WE, at the timing of a rising edge of the clock signal CLK. The command is decoded by the command decoder 31. It is noted that chip select CS is indicative of either the SDRAM 3 or 4. That is, chip select CS of low level (L) is indicatlve of the SDRAM 3, while chip select CS of high level (H) is indicative of the SDRAM 4.

FIG. 3 shows representative examples of the basic commands used in the SDRAM 3 of the present embodiment. As apparent from FIG. 3, each command used in the SDRAM 3 has chip select CS of low (L). The basic commands used in the SDRAM 4 are the same as those for the SDRAM 3 except that the chip select CS is set to high (H). Many other basic commands can be designated for each SDRAM 3 and 4, but description of them is omitted for clarity of description.

A "Bread" command for SDRAM 3 is designated when chip select CS is Low, row address strobe RAS is High, column address strobe CAS is Low, and write enable WE is High at the rising edge of the clock signal CLK. When the "read" command is designated, I/O data stored in the DRAM core 37 is outputted.

A "write" command for SDRAM 3 is designated when chip select CS is Low, row address strobe RAS is High, column address strobe CAS is Low, and write enable WE is Low at the rising edge of the clock signal CLK. When the "write" command is designated, I/O data is written in the DRAM core 37.

A "mode register set" command for SDRAM 3 is designated when all the chip select CS, row address strobe RAS, column address strobe CAS, and write enable WE are Low at the rising edge of the clock signal CLK. The "mode register set" command is a command for setting the CAS latency CL, the burst type BT, and the burst length BL. It is possible to designate the column address count up timing and count up number through setting the "mode register set" command to the mode register 35.

Figure 5:
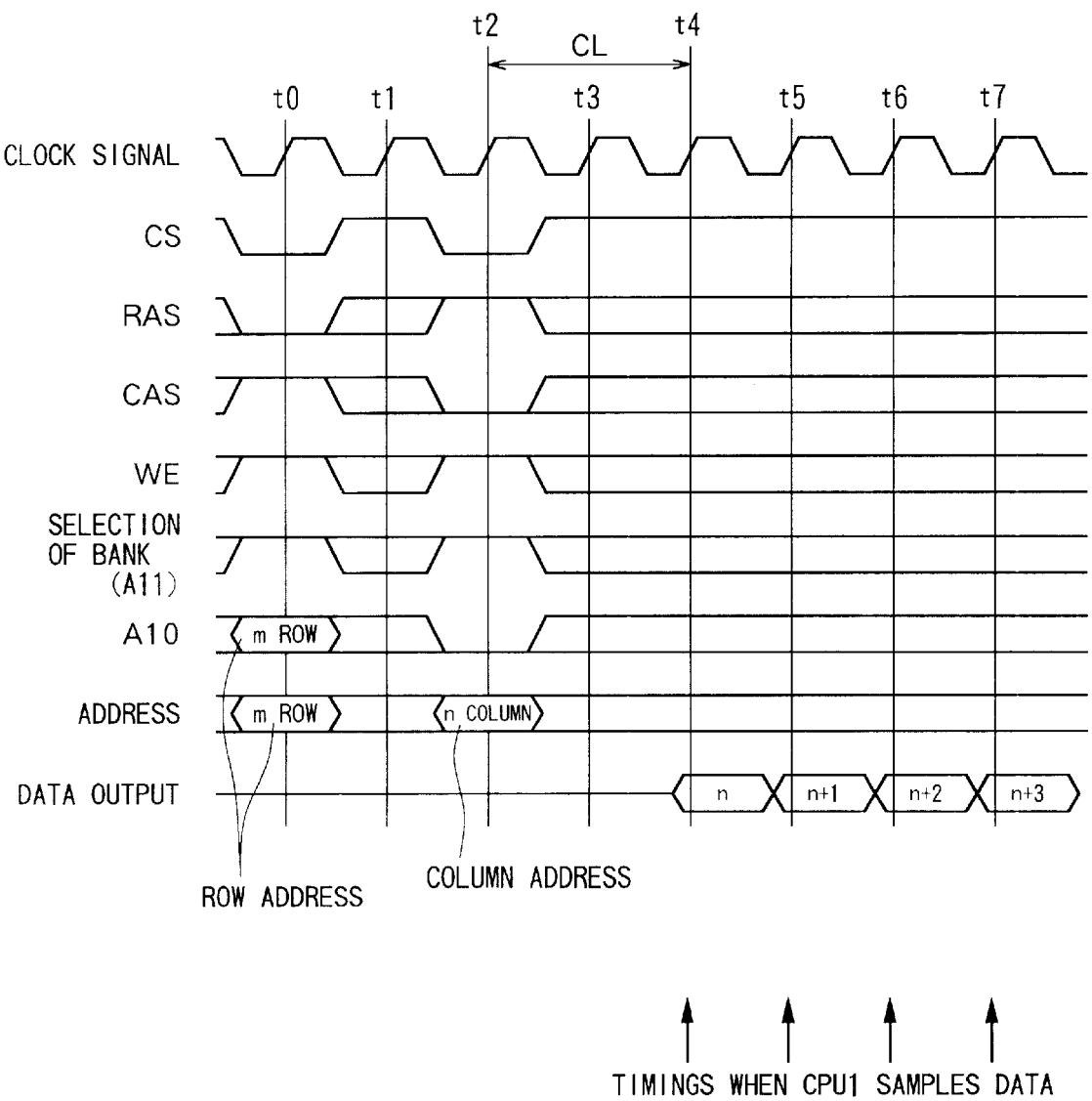
FIG. 5 is a timing chart showing a burst operation during the reading operation for the data storage device of FIG. 2.

The CAS latency CL is defined as the number of clock cycles required after the column address strobe signal CAS is inputted until I/O data is actually outputted as shown in FIG. 5. In the present embodiment, the CAS latency CL can be set in the range of one (1) to three (3) (CL=1–3). CL is set to two (2) in the example of FIG. 5.

The burst type BT designates an I/O data outputting timing or the like during the burst operation mode. The burst type BT is selected according to the type of the CPU 1 being used with the SDRA. In this example, the bust type BT is either one of a first type (sequential type) and a second type (interleaved type).

The burst length BL designates the number of I/O data to be serially outputted during the burst operation mode. In the present embodiment, the burst length BL can be set in the range of one (1) to eight (8) (BL=1–8). BL is set to four (4) in the example of FIG. 5.

When the "mode register set" command sets the CAS latency to two (2) (CL=2) and the burst length to four (4) (BL=4), the SDRAM of the present embodiment operates as described below.

As shown in FIG. 5, row address data A0–A10 is first set. At the timing t0, row address strobe RAS is switched to Low level, whereupon the row address data A0–A10 is –latched. Next, at the timing t1, chip select CS is switched to High level, and then switched back to Low level. Then, column address data A0–A10 is set. At the timing t2, column address strobe CAS is switched to Low level, whereupon column address data A0–A10 is latched.

Because write enable WE is maintained at High level at the timing t2, "read" command is set. Because CAS latency CL is set equal to two (2), the SDRAM outputs the first set of data "n" at the timing t4 that is after the timing t2 by two clock cycles so that the data "n" can be sampled by the CPU 1 at that timing when the clock signal CLK rises. Because the burst length BL is set equal to four (4), the second through fourth successive sets of data "n+1", "n+2", and "n+3" are outputted in synchronization with the rising edges of the clock signal CLK thereafter.

If write enable WE is switched to Low level at the timing t2, "write" command is set. In this case, I/O data writing operation is performed in the same manner as described above. Thus, SDRAM of the present embodiment can continuously perform I/O data reading/writing operation in synchronization with the clock signal CLK. Accordingly, a high speed access can be attained to the SDRAM.

Figure 4:
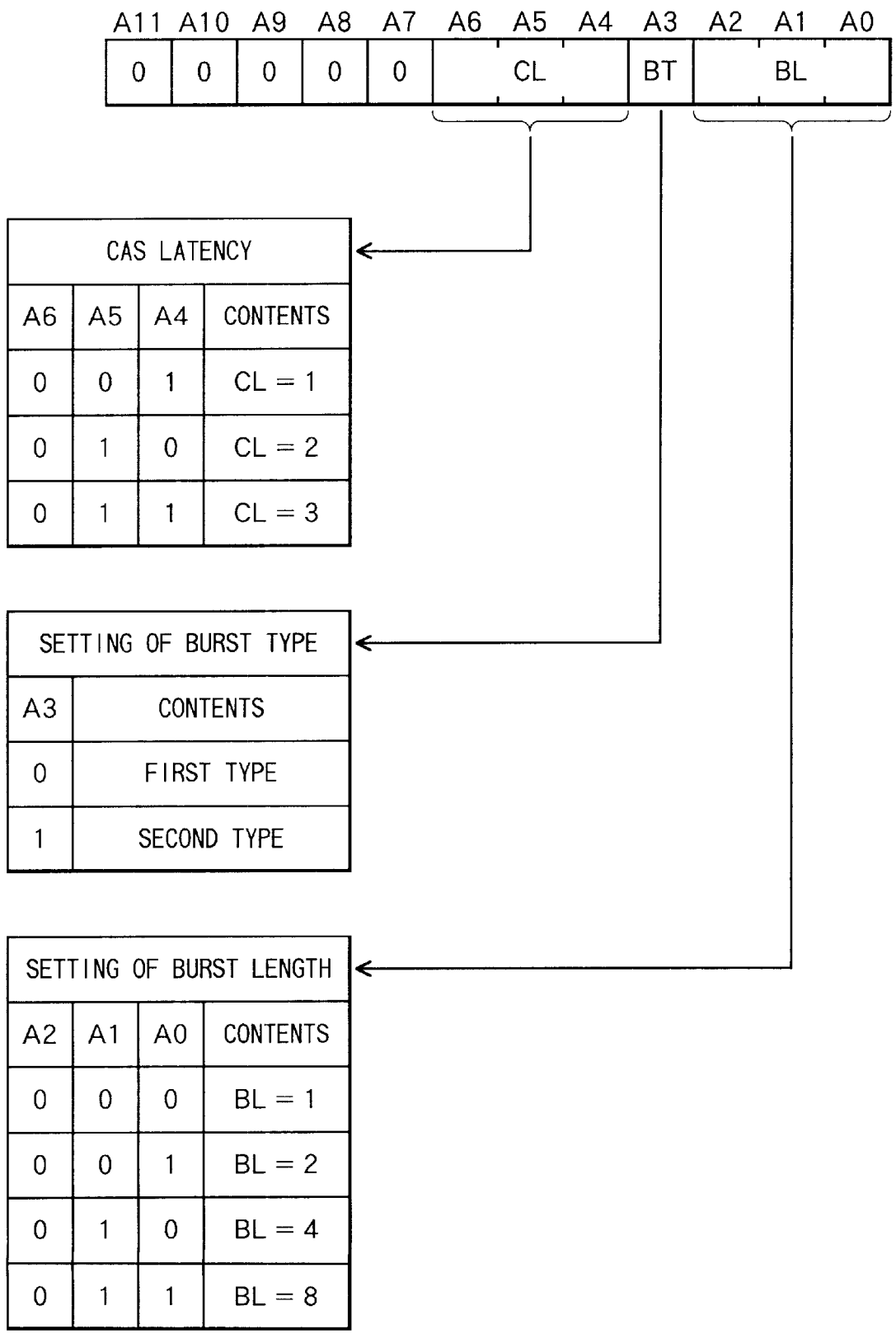
FIG. 4 is an illustration showing how a mode register for the data storage device of FIG. 2 is set, and shows the set values, the contents indicated by those values, and a location of each value set in the address data.

It is noted that the CAS latency CL, the burst type BT, and the burst length BL have to be set to the SDRAM with the "mode register set" command and address data A0–A11. As shown in FIG. 4, four bits of address data A8–A11 are fixed to zero (0). The CAS latency CL is designated by three bits of address data A4–A6. The burst type is designated by a single bit of address data A3. The burst length BL is designated by three bits of address data A0–A2.

When the mode register 35 is supplied with address data A0–A11 of "0000 0010 0010," for example, the SDRAM is set to the operation mode shown in FIG. 5. That is, the CAS latency CL is set to two (2), the burst type BT is set to the first type, and the burst length BL is set to four (4).

Figure 6:
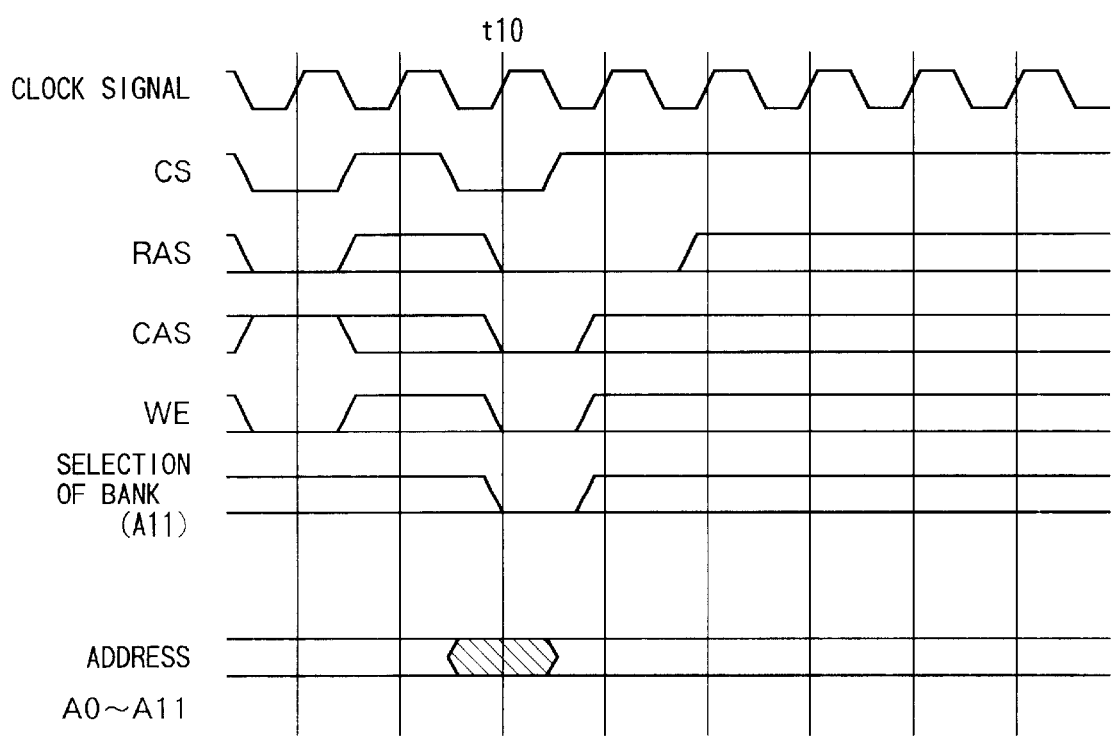
FIG. 6 is a timing chart for selecting a command for setting the mode register of the storage device in FIG. 2.

In order to set this operation mode to the SDRAM 3, as shown in FIG. 6, address data A0–A11 of "0000 0010 0010" is first set. Then, at the timing t10, all the control signals, i.e., chip select CS, row address strobe RAS, column address strobe CAS, and write enable WE, are switched to Low level. As a result, the SDRAM is set to the operation mode designated by the address data A0–A11.

Thus, the SDRAM of the present embodiment can be set with the desired operation mode. Accordingly, the SDRAM can provide a high-speed and useful data processing system.

As described above, the "mode register set" command is designated by the address data A0–A11. According to a conceivable method, in order to set the mode register as shown in FIG. 4, an address space is defined for the twelve bits A0–A11 or at least for the seven bits A0–A6 on a memory map set for the entire system. The CPU 1 calculates address data A0–A11 based on the content of the operation mode desired to be set. The CPU 1 then executes an operation to write some data to an address indicated by the address data A0–A11.

Figure 9:
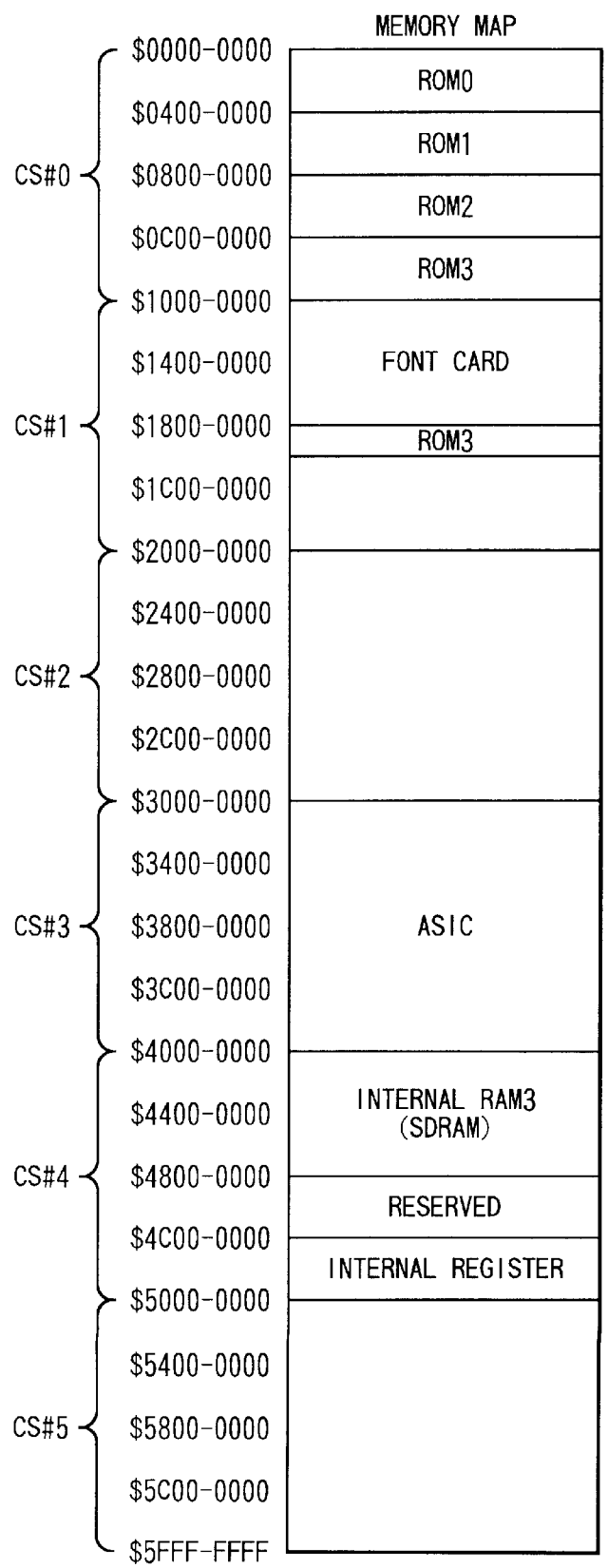
FIG. 9 illustrates a comparative memory map.

More specifically, according to the conceivable method, the memory map is designed as shown in FIG. 9, for example, onto the entire system. Addresses "$4000-0000" through "$4FFF-FFFF" are set to the SDRAM 3. Addresses "$4000-0000" through "$47FF-FFFF" are allocated to a memory element part of the SDRAM 3, and remaining addresses "$4C00-0000" through "$4FFF-FFFF" are allocated to the mode register in the SDRAM 3. In other words, the SDRAM memory element area is defined by addresses "$4000-0000" through "$47FF-FFFF", and the SDRAM mode register area is defined by addresses "$4C00-0000" through "$4FFF-FFFF".

It is noted that chip select CS is used for physically selecting the subject SDRAM 3 or 4. The memory element area and the mode register area for the RAM 3 are allocated in the address space indicated by the same address indication "$4*-**" as described above so that the chip select CS can be produced based on the high-order several bits of the address data A0–A11.

According to this conceivable method, especially when the CPU 1 desires to set the mode register with the CAS latency CL of two (2), the burst type BT of the first type, and the burst length BL of four (4) as in the example of FIG. 5, the CPU 1 has to perform an operation to write some data to an address that is indicated by address data "4C00-0022" and that is located inside the mode register area. SDRAM 3 is selected based on the high-order several bits of this address data. The low-order twelve bits of the address data, that is, address data A0–A11 ("0000 0010 0010") is then outputted to the SDPAM 3. When all the control signals CS, RAS, CAS, and WE are set to the low levels, the mode register command setting is attained. As a result, the SDRAM 3 is set with CAS latency CL of two (2), burst type BT of the first type, and burst length BL of four (4).

It is noted that a 32 bit CPU generally performs accessing operation in four byte units. Accordingly, the CPU generally accesses those addresses "$4C00-0000," "$4C00-0004," and "$4C00-0008," for example. In the above-described conceivable mode setting operation, however, the CPU 1 has to access address "$4C00-0022" that is located at a boundary between two bytes of address data. This processing is very troublesome.

Figure 8:
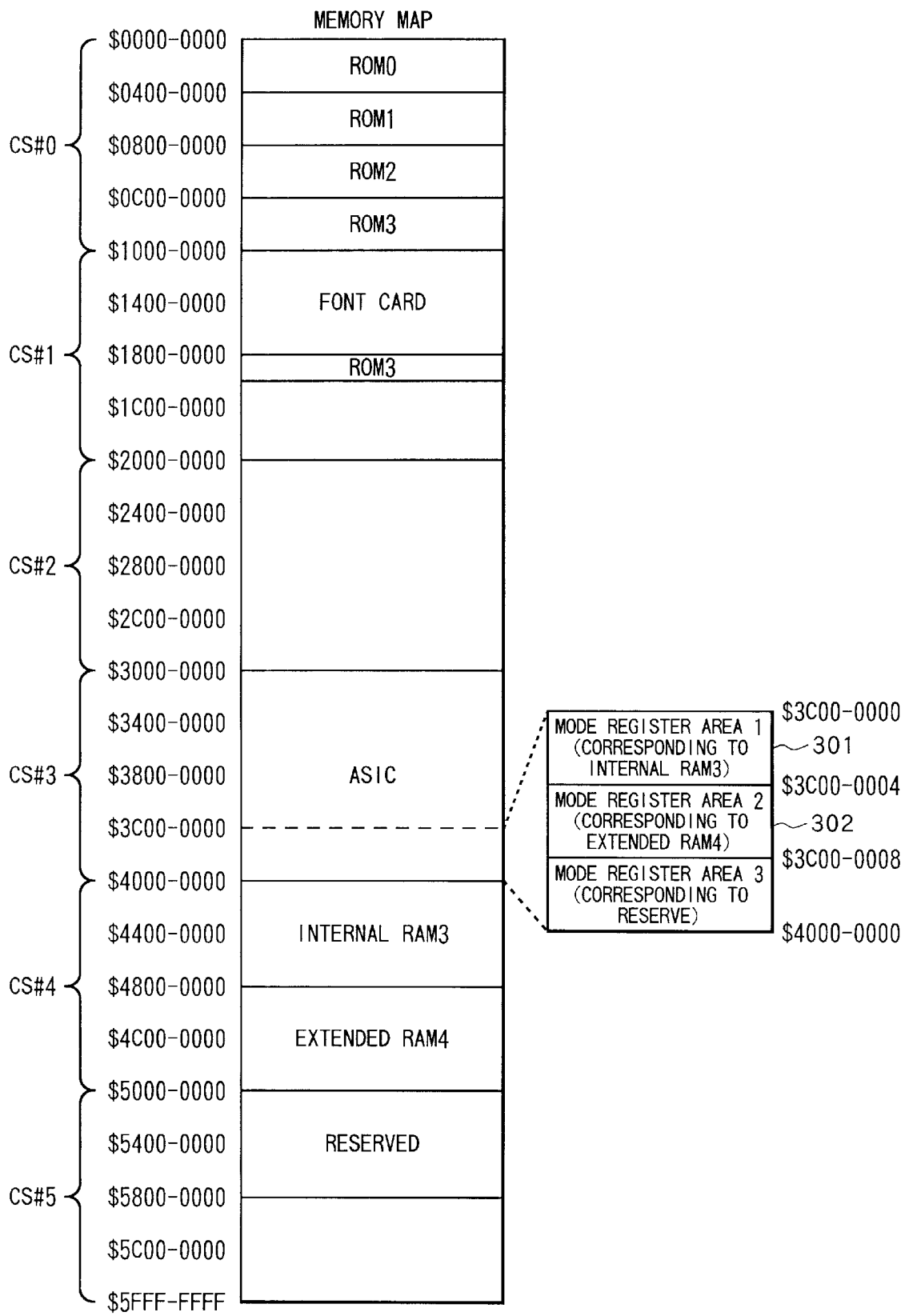
FIG. 8 illustrates a memory map for the data processing system of FIG. 1 according to the present embodiment.

In view of the above-described disadvantages in the conceivable method, according to the present embodiment, the memory map is constructed as shown in FIG. 8. Addresses for the mode register command setting region are set separately from addresses for the SDRAM memory element region. In this example, the addresses for the mode register command setting region is defined within the address region for the ASIC 5. More specifically, according to the present example, the memory element region for the internal RAM 3 is allocated in addresses "$4000-0000" through "$47FF-FFFF". The memory element region for the external RAM 4 is allocated in addresses "$4800-0000" through "$4FFF-FFFF". The memory element regions for the RAMs 3 and 4 are thus located next to each other. The mode register setting region for the internal RAM 3 (mode register command setting area 301) is allocated tn a four byte region from address "$3C00-0000". The mode register setting region for the external RAM 4 (mode register command setting area 302) is allocated in another four byte region from address "$3C00-0004". The mode register command setting area 301 is far setting a made setting command to all the eight SDRAMs in the RAM 3, and the mode register command setting area 302 is for setting a mode setting command to all the eight SDRAMs in the RAM 4.

Thus, addresses of both the mode register command setting regions 301 and 302 are set as separated from the addresses for the memory element regions of the SDRAMs 3 and 4. Accordingly, each mode register command setting region 301, 302 can be designed in a compact area, and can therefore be located within the address region for the single ASIC 5, for example. Accordingly, no restriction is required to design the address space for the entire system.

Additionally, according to the present embodiment, the memory control circuit 5a is constructed as described below. The memory control circuit 5a controls the internal RAM 3 and the expanded RAM 4 under control of the CPU 1.

Figure 7:
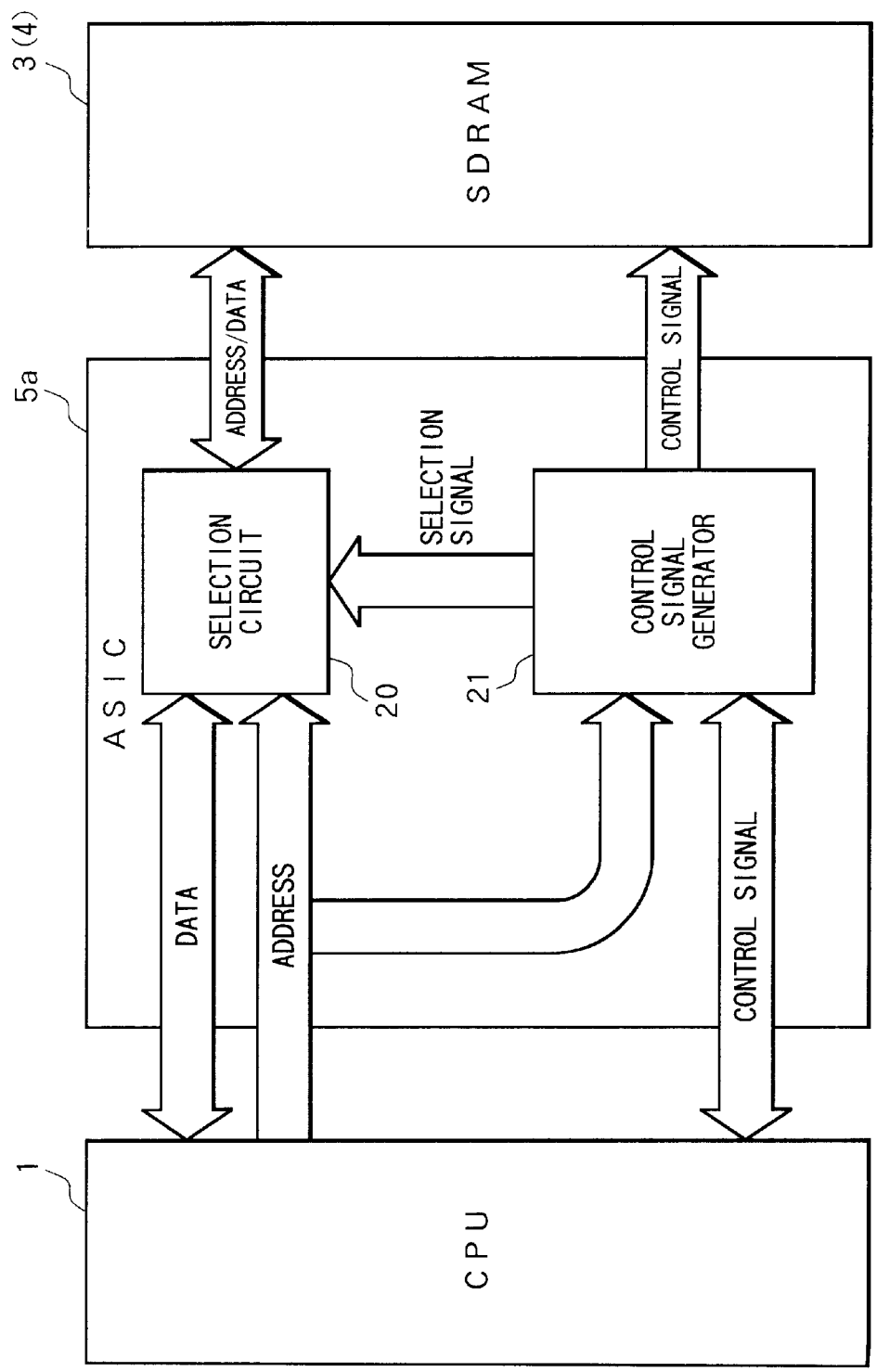
FIG. 7 is a block diagram showing an essential part of the data processing system of FIG. 1, and shows a data storage device and a control device for controlling the data storage device, where the data storage device (internal RAM and extended RAM) is indicated by SDRAM.

According to the present embodiment, as shown in FIG. 7, the memory control circuit 5a is provided with a selection circuit 20 and a control signal generating circuit 21.

The selection circuit 20 is for producing address data and for outputting the produced address data. That is, the selection circuit 20 is for receiving address data outputted from the CPU 1, for decoding the received address data, for producing address data A0–A11 indicative of an actual address in the internal RAM 3 or the extended RAM 4, and for outputting the address data A0–A11 to the RAM 3 or 4. The selection circuit 20 also performs data input/output operation between an address specified by the address data.

The control signal generating circuit 21 is for receiving control signals from the CPU 1, and for outputting the predetermined control signals CS, RAS, CAS, and WE to the internal RAM 3 or the expanded RAM 4 based on the received control signals. When necessary, the control signal production circuit 21 also outputs other predetermined control signals to the CPU 1.

As shown in FIG. 7, the control signal generating circuit 21 is constructed to be capable of receiving address data from the CPU 1. The control signal generating circuit 21 serves to judge whether the received address data indicates one of the predetermined addresses for the mode register setting regions 301 and 302 and to output a data selection signal to the selection circuit 20 when the received address data is determined to indicate one of the predetermined addresses for the mode register setting regions 301 and 302.

With the above-described structure, according to the present embodiment, when the system is turned ON, the CPU 1 executes the initialization control process. That is, the CPU 1 supplies the memory control circuit 5a with: a mode-setting control signal to set a desired operation mode of each of the RAMs 3 and 4; I/O data (comand data) indicative of the desired operation mode; and address data indicative of the corresponding mode register region 301 or 302.

For example, in order to set the RAM 3 with the CAS latency CL of two (2), the burst type BT of the first type, and the burst length BL of four (4), the CPU 1 outputs: a mode-setting control signal; command data "0000-0022"; and address data "$3C00-0000" indicative of the mode register setting region 301 for the RAM 3. The I/O data (command data) is read by the selection circuit 21. The address data is read by both the control signal generator 21 and the selection circuit 20. The control signal generator 21 judges whether or not the received address data is indicative of an address located in the mode register command set region 301 or 302. When the received address data is indicative of an address within the mode register command set region 301 or 302, the control signal generating circuit 21 outputs a selection signal to the selection circuit 20. Because the received address data is indicative of the address within the mode register command set region 301 in this case, the control signal generating circuit 21 outputs a selection signal to the selection circuit 20. Upon receipt of the selection signal, the selection circuit 20 extracts the contents of the inputted command that is written in the region indicated by the address data. The selection circuit 20 then outputs the command content as address data A0–A11 for the SDRAM 3. The control signal generating circuit 21 also receives the mode-setting control signal, and therefore outputs control signals CS, RAS, CAS, and WE of Low levels indicative of the mode setting command. As a result, the mode register 35 in the SDRAM 3 is set with the desired mode represented by the address data A0–A11.

Thus, according to the present embodiment, it is possible to set the mode register 35 in the SDRAM 3 or 4 with the desired operation mode when the CPU 1 simply executes the process to write contents of the command to the corresponding mode register command set region 301 or 302 on the memory map.

It is now assumed that the CPU 1 is controlled by the initialization control program to set the SDRAM 3 with the CAS latency CL of two (2), the first burst type BT, and the burst length BL of four (4) as shown in FIG. 5. In this case, the mode register 35 in the SDRAM 3 has to be inputted with a command content of "0000 0010 0010".

In this case, the CPU 1 first outputs a mode-setting control signal to the control signal generator 21. The CPU 1 further executes a process for writing four byte I/O data "0000-0022" (command data) to the four byte region defined from address "$3C00-0000." In other words, the CPU 1 outputs I/O data of "0000-0022" and address data of "$3C00-0000." The address data "$3C00-0000" indicates a location within the mode register command setting region 301 for the SDRAM 3.

When the CPU 1 outputs the address data "$3C00-0000", both the control signal generating circuit 21 and the selection circuit 20 read this address data "$3C00-0000". The control signal generating circuit 21 refers to the memory map of FIG. 8, and determines that this address data is indicative of an address located in the mode register command set region 301 for the SDRAM 3. Based on the determination, the control signal generating circuit 21 outputs a selection signal to the selection circuit 20.

Upon receipt of the selection signal, the selection circuit 20 extracts command content data "022" (=command content of "0000 0010 0010") from the I/O data "0000-0022," which has been supplied to the selection circuit 20 in correspondence with the address data "$3C00-0000". The selection circuit 20 then outputs the command content data "022" (=command content of "0000 0010 0010") as address data A11–A0. More specifically, the selection circuit 20 decodes the received I/O data, which has been encoded with the command content "0000-0022," extracts the value data "022" (="0000 0010 0010") from the decoded I/O data, and then again encodes the value data "022" into address data A0–A11. The selection circuit 20 then outputs the command content data "022" as address data A0–A11 (="0000 0010 0010") to the SDRAM 3. Because the control signal generating circuit 21 receives the mode-setting command and the address data indicative of the mode register command set region 301 for the RAM 3, the control signal generating circuit 21 supplies the RAM 3 with the mode register setting command in the form of the control signals CS, RAS, CAS, and WE of Low levels. Because this mode register set command includes the chip select signal CS of Low level that indicates the RAM 3, operation modes of all the eight SDRAMs in the RAM 3 are set by the address data A0–A11 of "0000 0010 0010". Thus, all the SDRAMs in the single RAM 3 can be set with the desired operation mode through the single mode register writing operation.

When desiring to set the same operation modes as described above to the external RAM 4, the CPU 1 outputs the mode-setting control signal, address data "$3C00-0004," and command data (I/O) data of "0000-0022". In the same manner as described above, the memory control circuit 5a produces and outputs address data A0–A11 of "0000 0010 0010" and another made setting command where chip select CS is high and row address strobe RAS, column address strobe CAS, and write enable WE are low. Because this mode setting command includes the chip select signal CS of high level that indicates the RAM 4, operation modes of all the eight SDRAMs in the RAM 4 are set by the address data A0–A11 of "0000 0010 0010". Thus, all the SDRAMs in the single RAM 4 can be set with the desired operation made through the single mode register writing operation.

When desiring to write/read process data (I/O data) to or from some memory cell in the RAM 3, the CPU 1 supplies the memory control circuit 5a with; a write/read control signal and address data indicative of the memory cell in the RAM 3. The address data is read by both the selection circuit 20 and the control signal generating circuit 21. Because the address data indicates an address within the memory element region between "$4000-0000" and "$47FF-FFFF" for RAM 3, the control signal generating circuit 21 determines that the address data is not indicative of any address within the mode register command setting region 301 or 302. The control signal generator 21 therefore does not output any selection signal to the selection circuit 20. In this case, the selection circuit 21 decodes the received address data and produces actual address data A0–A11 indicative of the desired memory cell. In the thus produced data A0–A11, data A11 indicates a bank, in which the memory cell is located, and data of A0–A10 is multiplexed with data of row address and column address for the memory cell. Because the control signal generating circuit 21 receives the address indicative of the RAM 3, the control signal generating circuit 21 outputs the control signal CS of low. If the control signal generating circuit 21 receives a write control signal, the control signal generating circuit 21 outputs the other remaining control signals RAS of high, CAS of low, and WE of low. Then, the CPU 1 performs data writing operation, via the data I/O data buffer/register 33, according to the operation mode set to the RAM 3. If the control signal generating circuit 21 receives a read control signal, on the other hand, the control signal generating circuit 21 outputs the control signals RAS of high, CAS of low, and WE of high. Then, the CPU 1 performs data reading operation, via the data I/O data buffer/register 33, according to the operation mode set to the RAM 3.

In the above description, the four byte address space is allocated to the mode register region for all the SDRAMs. in a single RAM, which can be set with the desired operation mode through a single mode register writing operation. However, the present invention is not limited to the above-description. For example, an address space of other various amounts can be allocated to each mode register region. An address space of an amount smaller than four bytes, equal to eight bytes, equal to 16 bytes, or the like can be allocated to each mode register region. When the CPU outputs address data indicative of an address located within an address space set for some mode register region, the control signal generating circuit 21 and the selection circuit 20 perform the above-described mode-setting operation assuming that the CPU also outputs I/O data (command data) for setting the corresponding mode register.

As described above, the mode register setting region 301 (302) for the SDRAM 3 (4) is provided on the memory map.

In order to set the mode register of the SDRAM 3 (4) with a desired operation modes the CPU 1 executes a writing operation to write a command content to this mode register setting region 301 (302). In other words, the CPU 1 outputs address data for that region 301 (302) and I/O data indicative of the desired command content. The control signal generating circuit 21 receives this address data, and judges whether or not this address data is indicative of the mode register setting region 301 or 302. When the control signal generating circuit 21 determines that this address data is indicative of the mode register setting region 301 or 302, the control signal generating circuit 21 outputs a selection signal to the selection circuit 20. Upon receipt of the selection signal, the selection circuit 20 generates specific address data, to be set to the mode register, based on the I/O data that has been inputted together with the original address data and that has been written in a region indicated by the original address data. The selection circuit 20 outputs the specific address data to the RAM. The mode register in the RAM is thus set with the desired mode indicated by the specific address data.

Thus, according to the present embodiment, it becomes unnecessary for the CPU 1 to calculate complicated address data specific to set the mode register. It becomes possible to perform a command setting operation onto the mode register through merely executing writing operation to write necessary data to a predetermined region on the memory map of a general structure, without writing any data to unusually-used addresses. The data processing system becomes easy for handling.

While the invention has been described in detail with reference to the specific embodiment thereof, it would be apparent to those skilled in the art that various changes and modifications may be made therein without departing from the spirit of the invention.

In the above-described embodiment, the SDRAM is used as one example of the memory device. However, the present invention is not limited to the SDRAM. The present invention can be applied to various types of memories that perform a mode register setting operation with using address data. It is noted, however, that especially when the present invention is applied to SDRAM, the entire data processing system can perform high-speed memory access operation in accordance with the operation mode set to the system.

In the embodiment described above, the present invention is applied to a printer system. However, the present invention can be applied also to other types of data processing systems that use data storage devices while performing mode register settings as described above. Representative examples of such systems include: personal computers, word processors, photocopiers, communication devices, and the like. When the present invention is employed to those systems, even when a memory device provided in those system is of a type, such as SDRAM, where information is stored in its mode register using address data, a control device in those systems can control the memory device using a memory map with a simple construction and using an easily-designed hardware structure.

What is claimed is:

1. A control device for controlling a data storage device of a type that receives address data indicative of a desired operation mode and that sets the desired operation mode in an operation mode setting portion provided thereto, the control device comprising:

means for receiving: a control signal for setting an operation mode, address data indicative of an operation mode setting portion of the data storage device, and command data indicative of a content of an operation mode desired to be set to the data storage device;

means for judging whether or not the received address data indicates the operation mode setting portion;

means for, when the address data indicates the operation mode setting portion, producing specific address data indicating the desired operation mode based on the received command data and a specific control signal for setting the operation mode setting portion; and means for outputting, to the data storage device, the specific address data and the specific control signal, thereby causing the operation mode setting portion to be set with the desired operation mode.

2. A control device as claimed in claim 1, wherein the data storage device includes a synchronous dynamic random access memory provided with a mode register for being set with the desired operation mode.

3. A control device as claimed in claim 1, wherein the address data producing means includes:

means for decoding the received command data and for extracting information on the desired operation mode from the decoded command data; and means for encoding the extracted information and for producing the specific address data.

4. A control device as claimed in claim 1, wherein the data storage device further includes a plurality of memory elements for being stored with process data, further comprising:

means for storing a memory map indicative of a first address region indicative of the plurality of memory elements and a second address region indicative of the operation mode setting portion, the first and second address regions being separated from each other on the memory map, the judging means judging whether or not the received address data indicates the second address region.

5. A control device as claimed in claim 4, wherein the receiving means further receives: a data processing control signal for processing process data with the data storage device and address data indicative of a memory element desired to be processed with process data, wherein the producing means, when the judging means judges that the received address data indicates the first address region, decodes the received address data and produces memory element address data, indicative of the memory element desired to be processed as indicated by the address data, and a processing control signal for processing process data with the desired memory element, and wherein the outputting means outputs, to the data storage device, the memory element address data and the processing control signal, thereby allowing the desired memory element to be processed with process data in the desired operation mode set in the operation mode setting portion.

6. A control system, comprising:

a data storage device including:

a plurality of memory elements;

means for storing designation information designating an operation mode of the data storage device; and means for controlling an operation of the data storage device in accordance with the designation information stored in the information storing means, the controlling means selecting a desired memory element indicated by memory element address data when the memory element address data and a memory element control signal are inputted, the controlling means extracting designation information from designation address data and storing the designation information to the information storage means when the designation address data and a designation control signal are inputted;

a data processing device for writing process data to and reading process data from the selected memory element, the data processing device outputting original address data, an original memory control signal, an original designation control signal, and designation content data indicative of a desired operation mode; and a control device for controlling the data storage device, the control device being connected between the data storage device and the data processing device, the control device including:

means for judging whether or not the original address data inputted from the data processing device indicates the information storage means;

means for, when the original address data indicates the information storage means, producing the designation address date, including the designation information, based on the designation content data, which is outputted from the data processing device in correspondence with the original address data, and for producing the designation control signal based on the original designation control signal;

means for, when the original address data indicates some memory element, producing the memory element address data based on the original address data and for producing the memory element control signal based on the original memory element control signal; and means for outputting, to the data storage device, the designation address data and the designation control signal when the designation address data and the designation control signal are produced, and for outputting, to the data storage device, the memory element address data and the memory element control signal when the memory element address data and the memory element control signal are produced.

7. A control system as claimed in claim 6, wherein the data storage device includes a synchronous dynamic random access memory that operates in synchronization with a clock signal which is supplied to the data processing device.

8. A control system as claimed in claim 6, further comprising a memory storing a map indicating a first address region for the plurality of memory elements in the data storage device and a second address region for the information storage means, the first address region and the second address region being defined separately from each other, wherein the judging means judges whether or not the inputted original address data indicates an address within the second address region.

9. A control system as claimed in claim 8, wherein the map further indicates a control address region for the control device, the control address region including the second address region therein.

10. A control system as claimed in claim 6, wherein the designation content data includes encoded information on the desired operation mode, and wherein the designation address data production means includes:

means for decoding the designation content data, outputted together with the original address data, and extracting the operation mode information from the designation content data; and means for encoding the extracted operation mode information and producing the designation address data.

11. A control system as claimed in claim 6, wherein the memory element address data production means includes means for decoding the original address data and for producing the memory element address data.

12. A control system for controlling a data storage device, the system comprising:

a data storage device including:

a plurality of memory elements;

means for storing designation information designating an operation mode of the data storage device; and means for controlling operation of the data storage device in accordance with: the designation information stored in the information storing means and a control signal and address data inputted thereto, thereby selecting a desired memory element in accordance with input of address data, and, in response to specific address data inputted together with a predetermined control signal, extracting the designation information from the specific address data and storing the designation information to the information storage means;

a data processing device for writing process data to and reading process data from the selected memory element of the data storage device, the data processing device outputting original process data and original address data; and a control device for controlling the data storage device, the control device being connected between the data storage device and the data processing device, the control device producing the control signal, the address data, and the process data based on the original address data and the original process data outputted from the data processing device, the control device including:

means for judging whether or not the original address data outputted from the data processing device indicates the information storage means to be selected;

means for, when the original address data indicates the information storage means, producing the specific address data, including the designation information, based on the original process data outputted from the data processing device in correspondence with the original address data; and means for outputting, to the data storage device, the specific address data including the designation information.

13. A control system as claimed in claim 12, wherein the data storage device includes a synchronous dynamic random access memory that operates in synchronization with a clock signal which is supplied to the data processing device.

14. A control device for controlling a data storage devices the control device being provided in connection with the data storage device and a data processing device, the data storage device including: a plurality of memory elements; means for storing designation information designating an operation mode of the data storage device; and means for controlling an operation of the data storage device in accordance with: the designation information stored in the information storing means and a control signal and address data inputted thereto, thereby selecting a desired memory element in accordance with an input of address data, and, in response to specific address data inputted together with a predetermined control signal, extracting the designation information from the specific address data and storing the designation information to the information storage means, the data processing device being for writing process data to and reading process data from the selected memory element of the data storage device, the data processing device outputting original process data and original address data, the control device being for producing the control signal, the address data, and the process data based on the original address data and the original process data outputted from the data processing device, the control device including:

means for judging whether or not the original address data outputted from the data processing device indicates the information storage means to be selected;

means for, when the original address data indicates the information storage means, producing specific address data, including the designation information, based on the original process data outputted from the data processing device in correspondence with the original address data; and means for outputting, to the data storage device, the specific address data including the designation information.

15. A control system as claimed in claim 14, wherein the data storage device includes a synchronous dynamic random access memory that operates in synchronization with a clock signal.

16. A method for controlling a data storage device of a type that receives address data indicative of a desired operation mode and that sets the desired operation mode in an operation mode setting portion provided thereto, the method comprising the steps of:

receiving: a control signal for setting an operation mode, address data indicative of an operation mode setting portion of the data storage device, and command data indicative of a content of an operation mode desired to be set to the data storage device;

judging whether or not the received address data indicates the operation mode setting portion;

producing, when the address data indicates the operation mode setting portion, specific address data indicating the desired operation mode, based on the received command data, and a specific control signal for setting the operation mode setting portion; and outputting, to the data storage device, the specific address data and the specific control signal, thereby causing the operation mode setting portion to be set with the desired operation mode.

17. A method as claimed in claim 16, wherein the data storage device includes a synchronous dynamic random access memory provided with a mode register for being set with the desired operation mode.

18. A method as claimed in claim 16, wherein the address data producing step includes the steps of:

decoding the received command data and extracting information on the desired operation mode from the decoded comnmand data; and encoding the extracted information and producing the specific address data.

19. A method as claimed in claim 16, wherein the data storage device further includes a plurality of memory elements for being stored with process data, wherein the judging step includes the step for searching a memory map indicative of a first address region indicative of the plurality of memory elements and a second address region indicative of the operation mode setting portion, the first and second address regions being separated from each other on the memory map, thereby judging whether or not the received address data indicates the second address region.

20. A method as claimed in claim 19, wherein the receiving step further receives: a data processing control signal for processing process data with the data storage device and address data indicative of a memory element desired to be processed with process data, wherein the producing stop includes the step for producing, when the judging step judges that the received address data indicates the first address region, memory element address data, indicative of the desired memory element indicated by the address data, and a processing control signal for processing process data with the desired memory element, and wherein the outputting step outputs, to the data storage device, the memory element address data and the processing control signal, thereby allowing the desired memory element to be processed with process data in the desired operation mode set in the operation mode setting portion.

21. A method for controlling a data storage device located in a data processing system, which includes at least the data storage device, a data processing device, and another peripheral device, the data storage device including: a plurality of memory elements; means for storing designation information designating an operation mode of the data storage device; and means for controlling an operation of the data storage device in accordance with: the designation information stored in the information storing means, and a control signal and address data inputted thereto, thereby selecting a desired memory element in accordance with an input of address data, and, in response to specific address data inputted together with a predetermined control signal, extracting the designation information from the specific address data and storing the designation information to the information storage means, the data processing device being for writing process data to and reading process data from the selected memory element of the data storage device, the method for controlling the data storage device includes the steps of:

allocating an address region for the memory elements of the data storage device and another address region for the peripheral device in a predetermined address space for the entire data processing system;

outputting original process data, including encoded designation information, together with original address data indicative of the peripheral device when desiring to store designation information to the information storage means;

decoding the original process data, outputted together with the original address data, and extracting the designation information from the original process data;

encoding the extracted designation information and producing specific address data and a specific control signal; and outputting the specific address data, which includes the designated identification information, and the specific control signal to the data storage device.

22. A control method as claimed in claim 21, wherein the data storage device includes a synchronous dynamic random access memory that operates in synchronization with a clock signal.

* * * * *